US008264152B2

(12) United States Patent
Matsunaga et al.

(10) Patent No.: US 8,264,152 B2
(45) Date of Patent: Sep. 11, 2012

(54) VEHICLE LAMP

(75) Inventors: Takashi Matsunaga, Shizuoka (JP); Ryujiro Ikuta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 138 days.

(21) Appl. No.: 12/843,193

(22) Filed: Jul. 26, 2010

(65) Prior Publication Data

US 2011/0031884 A1 Feb. 10, 2011

(30) Foreign Application Priority Data

Aug. 7, 2009 (JP) ................................ 2009-184288

(51) Int. Cl.
*B60Q 1/02* (2006.01)

(52) U.S. Cl. ............. 315/82; 315/77; 362/387; 362/546

(58) Field of Classification Search .................... 315/77, 315/82, 158; 362/294, 487, 546
See application file for complete search history.

(56) References Cited

U.S. PATENT DOCUMENTS 7,841,756 B2 * 11/2010 Kracker et al. ............... 362/505
2008/0157678 A1 * 7/2008 Ito et al. .......................... 315/77
2009/0196064 A1 * 8/2009 Kracker et al. ............... 362/547

FOREIGN PATENT DOCUMENTS

JP 2001126510 A 5/2001
JP 2008-084578 A 4/2008

OTHER PUBLICATIONS

Chinese Office Action dated Apr. 30, 2012 issued by the State Intellectual Property Office of P.R. China in counterpart Chinese Patent Application No. 10-2010-0075563.

Korean Office Action dated Apr. 30, 2012 issued by the Korean Intellectual Property Office in counterpart Korean Patent Application No. 10-2010-0075563.

* cited by examiner

*Primary Examiner* — Don Le
(74) *Attorney, Agent, or Firm* — Sughrue Mion, PLLC

(57) ABSTRACT

A vehicle lamp includes a semiconductor light emitting device as a light source, a power supply module configured to supply electric power from a power source to the semiconductor light emitting device, and a housing in which the power supply module is accommodated. The semiconductor light emitting device is mounted on the power supply module. The power supply module comprises a current control circuit configured to control an amount of current supplied to the semiconductor light emitting device. The semiconductor light emitting device and the current control circuit are arranged to overlap each other in a direction of an optical axis of the semiconductor light emitting device.

6 Claims, 4 Drawing Sheets

VEHICLE LAMP

CROSS-REFERENCE TO RELATED APPLICATIONS

The present application claims priority from Japanese Patent Application No. 2009-184288 filed on Aug. 7, 2009, the entire content of which is incorporated herein by reference.

FIELD OF INVENTION

Apparatuses consistent with the present invention relate to a vehicle lamp and, more particularly, to a vehicle lamp having a semiconductor light emitting device which serves as a light source, a power supply module configured to supply electric power from a power source to the semiconductor light emitting device, and a housing configured to accommodate the power supply module.

DESCRIPTION OF RELATED ART

A semiconductor light emitting device, such as a light emitting diode, emits light with very small current. Accordingly, a semiconductor light emitting device has low power consumption and long life as compared to a filament bulb. Related art vehicle lamps include, for example, a vehicle tail lamp having a semiconductor light emitting device as a light source (see, e.g., JP 2008-084578 A) and a vehicle headlamp having a high-luminance semiconductor light emitting device.

When using a semiconductor light emitting device as a light source of a vehicle lamp, a current control circuit is provided to control current supplied to the semiconductor light emitting device. The current control circuit is arranged in a limited space inside a lamp housing. Further, a semiconductor light emitting device is relatively weak against heat. Therefore, a heat dissipating structure is provided to efficiently dissipate heat from the semiconductor light emitting device and the current control circuit.

BRIEF SUMMARY

According to an illustrative aspect of the present invention, a vehicle lamp includes a semiconductor light emitting device as a light source, a power supply module configured to supply electric power from a power source to the semiconductor light emitting device, and a housing in which the power supply module is accommodated. The semiconductor light emitting device is mounted on the power supply module. The power supply module comprises a current control circuit configured to control an amount of current supplied to the semiconductor light emitting device. The semiconductor light emitting device and the current control circuit are arranged to overlap each other in a direction of an optical axis of the semiconductor light emitting device.

Other aspects and advantages of the invention will be apparent from the following description, the drawings and the claims.

DETAILED DESCRIPTION

Hereinafter, an exemplary embodiment of the present invention will be described in detail with reference to the drawings. However, the following exemplary embodiment does not limit the scope of the claimed invention, and all combinations of features of the exemplary embodiment are not necessarily required to address the problem described above.

Figure 1:
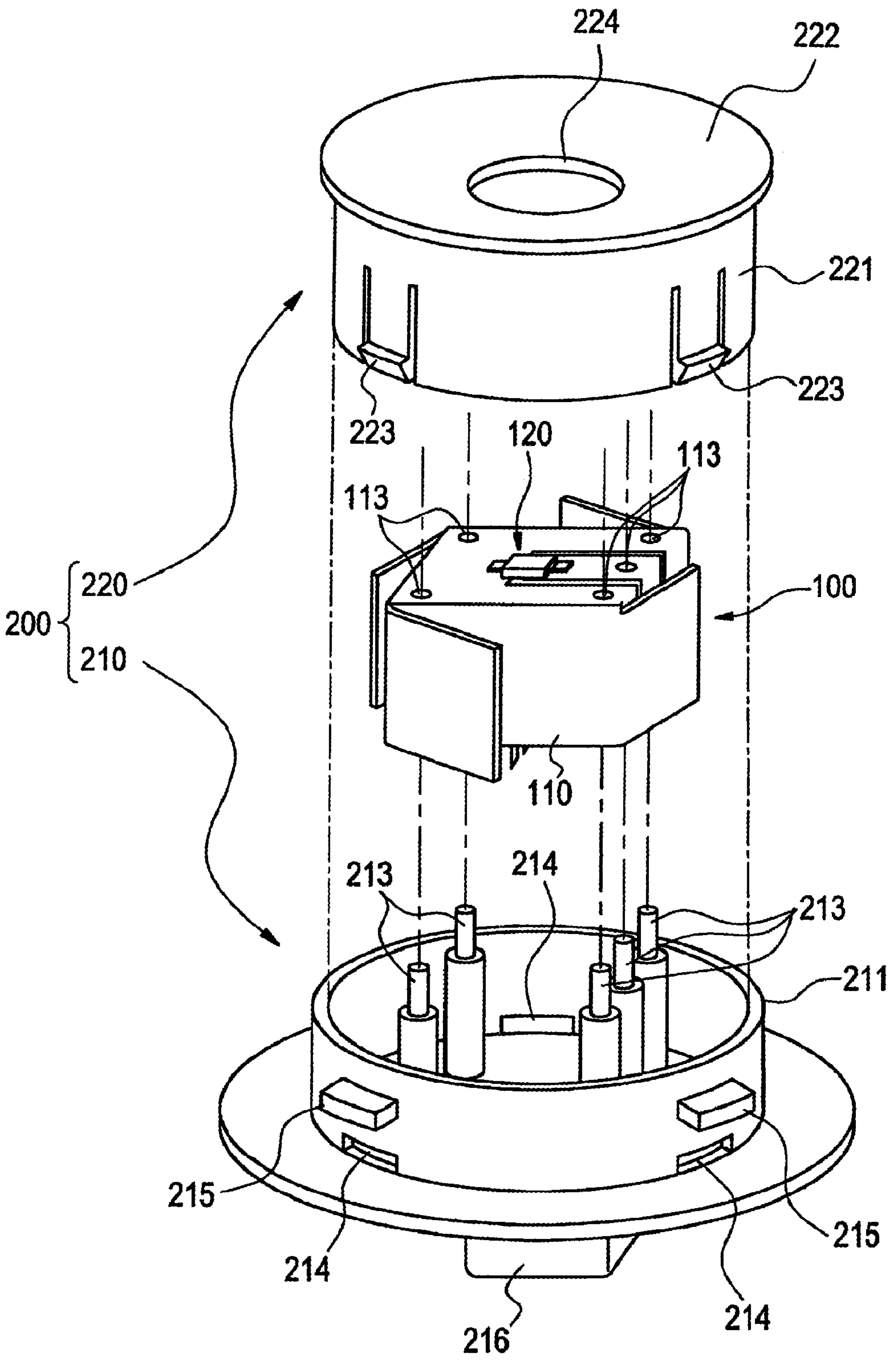
FIG. 1 is an exploded perspective view of a vehicle lamp according to an exemplary embodiment of the present invention.

FIGS. 1 to 4 illustrate aspects of a vehicle lamp according to the exemplary embodiment. As shown in FIG. 1, the vehicle lamp includes a power supply module 100, a light emitting device 120 mounted on the power supply module 100 to as a light source of the vehicle lamp, and a housing 200 configured to accommodate the power supply module 100 and the light emitting device 120. The vehicle lamp is adapted for use in, for example, a rear combination lamp, or in a headlamp to irradiate a region in front of a vehicle.

Figure 2:
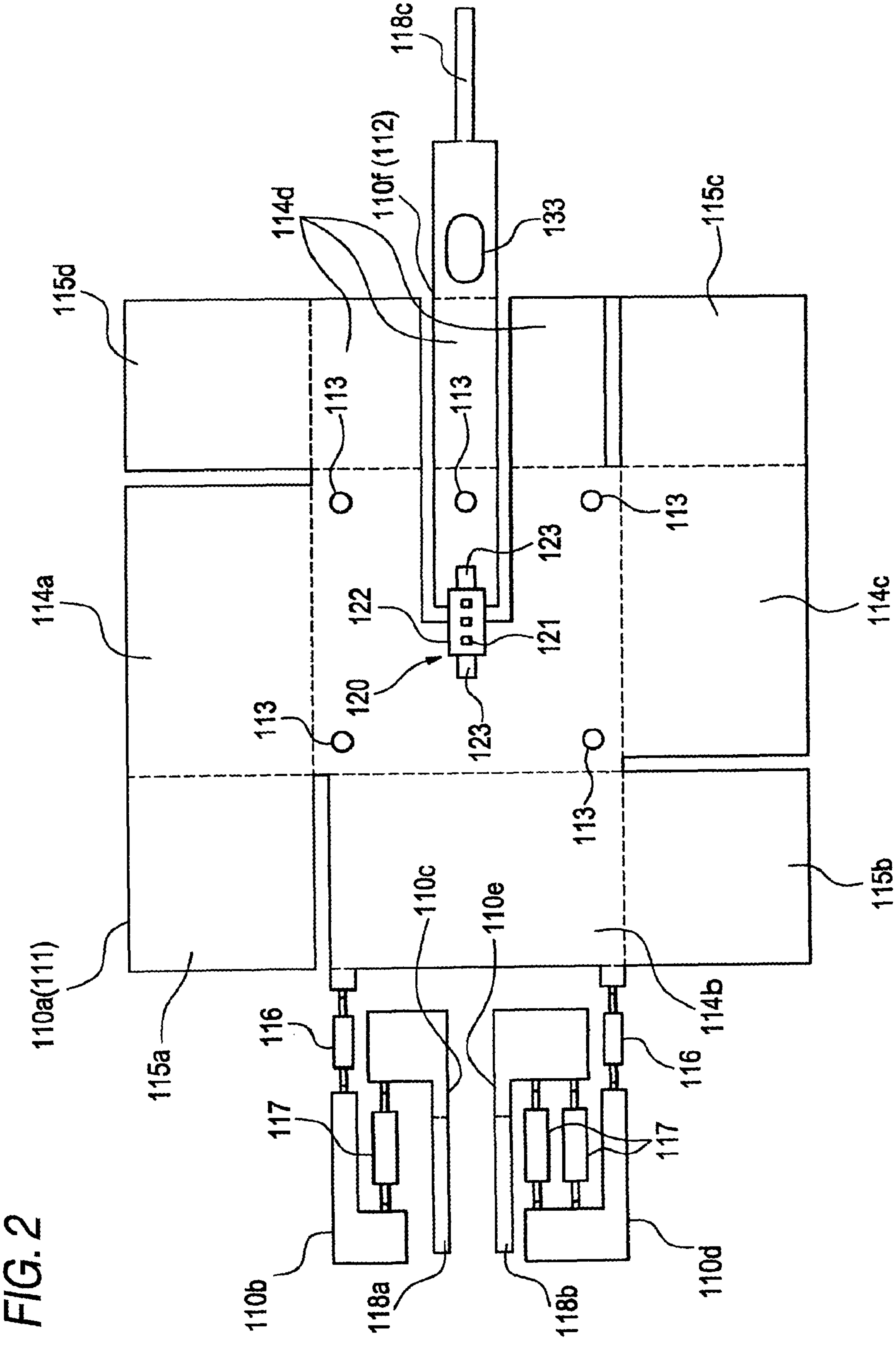
FIG. 2 is a plan view of a power supply module before being formed as a casing.

As shown in FIG. 1, the power supply module 100 has a form of a casing like a rectangular box. The power supply module 100 has a conductive plate 110 which forms an exterior of the power supply module 100. As shown in FIG. 2, the power supply module 100 may be manufactured providing planar members and three-dimensionally assembling the planar members. More specifically, according to the exemplary embodiment, a plurality of conductive plates 110*a*, 110*b*, 110*c*, 110*d*, 110*e*, 110*f* is cut out from a plate made of a conductive material such as stainless steel.

Then, the conductive plates 110*b*, 110*c*, 110*d*, 110*e*, rectifier diodes 116, and current control resistors 117 are fixed to one side of the conductive plate 110*a* as shown in FIG. 2. The rectifier diodes 116 and the current control resistors 117 may be fixed to the conductive plates 110*b*, 110*c*, 110*d*, 110*e* by soldering. Preferably, rectifier diodes 116 and the current control resistors 117 are fixed to the conductive plates 110*b*, 110*c*, 110*d*, 110*e* by partially crimping the conductive plates 110*b*, 110*c*, 110*d*, 110*e*.

The light emitting device 120 is fixed to the conductive plate 110*a* at a position shown in FIG. 2 such that the optical axis of the light emitting device 120 is directed toward the front of the lamp. The light emitting device 120 is an example of a semiconductor light emitting device, and includes a light emitting part 122 and a lead frame 123 as shown in FIG. 2. The light emitting part 122 may have a plurality of LED chips 121 (three in this exemplary embodiment). The LED chips 121 are sealed by a transparent resin material, and are electrically coupled to each other via the lead frame 123. Both ends of the lead frame 123 extend out from respective sides of the light emitting part 122.

One of the extended portions of the lead frame 123 serves as a positive terminal of the light emitting device 120, and is fixed to the conductive plate 110*a* and electrically coupled to the conductive plate 110*a*. The other of the extending portions serves as a ground terminal of the light emitting device 120, and is fixed to the conductive plate 110*f* and electrically coupled to the conductive plate 110*f* The lead frame 123 is fixed to the conductive plates 110*a*, 110*f* by, for example, laser welding.

The conductive plate 110*a* is configured to function as a positive electrode connecting part 111, and is electrically coupled to a positive electrode of a power source via a current control circuit and power source-side electrodes 118a, 118b. The conductive plate 110f is configured to function as a ground connecting part 112, and is electrically coupled to a ground potential via a ground-side electrode 118c.

After the light emitting device 120 is mounted as described above, as shown in FIG. 2, insertion holes 113 are formed at five positions, that is, four positions on the conductive plate 110a and one position on the conductive plate 110f. Further, an insertion hole 133, which is larger than the insertion hole 113, is formed at another position on the conductive plate 110f. Each of the conductive plates 110a, 110c, 110e, 110f are bent along the respective broken lines shown in FIG. 2, whereby the power supply module 100 as shown in FIG. 1 is formed.

Portions along and near a perimeter of the positive electrode connecting part 111 (the conductive plate 110a) are folded so as to be substantially parallel to the direction of the optical axis of the light emitting device 120, respectively, thereby forming side walls 114a, 114b, 114c, 114d of the power supply module 100. A portion of the ground connecting part 112 (the conductive plate 1100 is also folded so as to be substantially parallel to the direction of the optical axis of the light emitting device 120, thereby forming a part of the side wall 114d.

Each of the side walls 114a, 114b, 114c, 114d has an extension wall 115a, 115b, 115c, 115d, which extend in a direction substantially perpendicular to the direction of the optical axis of the light emitting device 120. Further, according to this exemplary embodiment, the extension walls 115a, 115b, 115c, 115d are further folded toward the optical axis of the light emitting device 120 at corner portions between the adjacent ones the side walls 114a, 114b, 114c, 114d.

Figure 4:
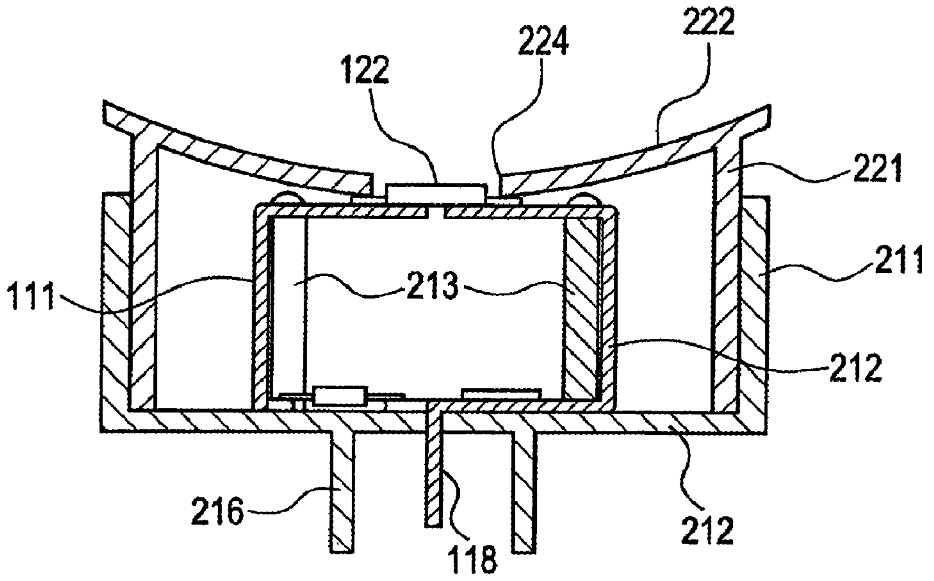
FIG. 4 is a sectional view of the vehicle lamp.

Distal end portions of the conductive plates 110c, 110e, 110f are further folded so as to be parallel to the direction of the optical axis of the light emitting device 120, thereby forming electrodes 118a, 118b, 118c that protrude downward from a connector 216 when the power supply module 100 is fitted to the housing 200 (see FIG. 4). In this exemplary embodiment, the electrodes 118a, 118b formed by folding the distal end portions of the conductive plates 110c, 110e function as power source-side electrodes that are coupled to a power source, and the electrode 118c formed by folding the distal end portion of the conductive plate 110f functions as a ground-side electrode that is coupled to ground potential.

The light emitting device 120 is mounted at a center of a top surface of the power supply module 100. On the other hand, the conductive plates 110b, 110c, 110d, 110e, the rectifier diodes 116, and the current control resistors 117 are arranged in a bottom side of the power supply module 100. The conductive plates 110b, 110c, 110d, 110e, the rectifier diodes 116, and the current control resistors 117 form a current control circuit that controls an amount of current supplied from the power source-side electrodes 118a, 118b to the light emitting device 120.

The housing 200 includes an upper housing part 220 and a lower housing part 210. The lower housing part 210 includes a disk-shaped bottom wall 212 and a cylindrical side wall 211 that extends from the bottom wall 212 so as to be perpendicular to the bottom wall. A connector 216 extends from a center region of the bottom wall 212 in a direction opposite to the direction in which the side wall 211 extends. Further, a plurality of stepped bosses 213 (five in this exemplary embodiment) is disposed in a region surrounded by the side wall 211. Each of the stepped bosses 213 is provided to extend from the bottom wall 212 substantially in the same direction as the side wall 211 in a columnar manner. An upper portion of each of the stepped bosses 213 has a diameter substantially equal to an inner diameter of the insertion hole 113 of the power supply module 100.

Figure 3:
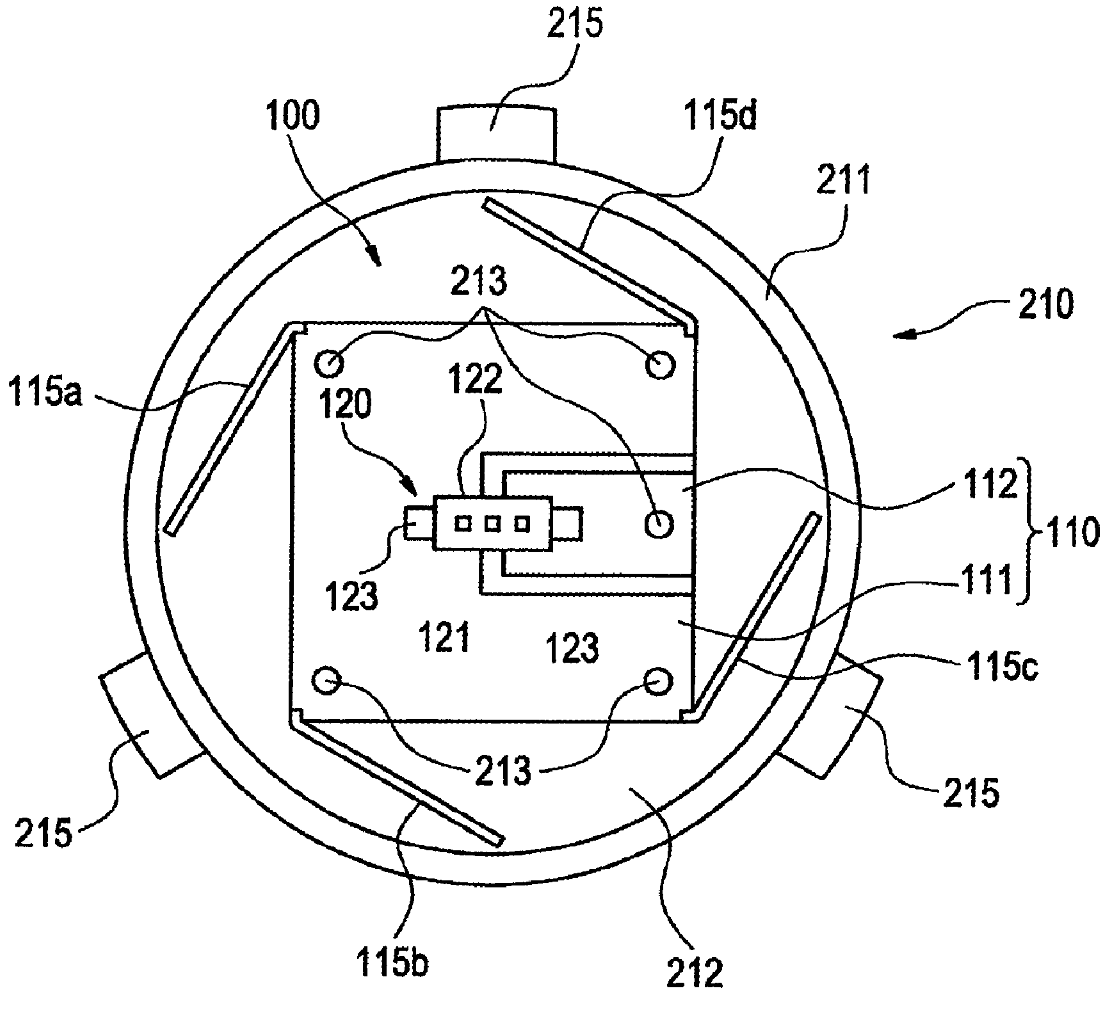
FIG. 3 is a top view of the power supply module mounted on a lower housing part.

As shown in FIGS. 1 and 3, locking protrusions 215 are provided on the side wall 211 of the lower housing part 210 at regular intervals along a circumferential direction of the side wall 211. In the exemplary embodiment, three locking protrusions 215 are arranged at intervals of 120°. The locking protrusions 215 are used when attaching the vehicle lamp to a lamp body 300.

The upper housing part 220 includes a top wall 222 having an opening 224 in a center thereof, and a cylindrical side wall 221 extending from the top wall 222 substantially perpendicular to the top wall 222. The top wall 222 has a curved surface, which is concave in the direction in which the side wall 221 extends, on an opposite side of the side wall 221. On the curved surface of the top wall 222, a material having high reflectance, such as aluminum, is deposited.

Fitting protrusions 223 are formed on the side wall 221 of the upper housing part 220 at regular intervals along the circumferential direction. In this exemplary embodiment, three fitting protrusions 223 are arranged at intervals of 120°. Counterpart fitting holes 214 are formed in the side wall 211 of the lower housing part 210 at regular intervals along the circumferential direction. In this exemplary embodiment, three fitting holes 214 are arranged at intervals of 120°.

The vehicle lamp is assembled by attaching the power supply module 100 to the lower housing part 210 so that the light emitting device 120 faces upward, and fitting the upper housing part 220 to the lower housing part 210. More specifically, first, the stepped bosses 213 of the lower housing part 210 are inserted into the insertion holes 113 of the power supply module 100. Then, portions of the respective stepped bosses 213, which protrude from the insertion holes 113, are welded, whereby the power supply module 100 is fixed to the lower housing part 210.

The extension walls 115a, 115b, 115c, 115d, which extend from the side walls 114a, 114b, 114c, 114d of the power supply module 100, are folded toward the optical axis of the light emitting device 120 as described above. Therefore, when the power supply module 100 is fitted to the lower housing part 210, the extension walls 115a, 115b, 115c, 115d do not become obstacles as shown in FIG. 3.

Next, the upper housing part 220 and is fitted to the lower housing part 210. More specifically, an outer surface of the side wall 221 of the upper housing part 220 slides on an inner surface of the side wall 211 of the lower housing part 210, and the fitting protrusions 223 of the upper housing part 220 are fitted into the respective fitting holes 214 of the lower housing part 210, so that the upper and lower housing parts 220 and 210 are fixed to each other.

According to the vehicle lamp assembled in the manner described above, as shown in FIG. 4, the light emitting surface of the light emitting device 120 is exposed to the outside through the opening 224 of the upper housing part 220. The direction of the optical axis of the light emitting device 120 is oriented in a front-rear direction of the lamp (the vertical direction in FIG. 4). The electrodes 118a, 118b, 118c of the power supply module 100 protrude from a central portion of the connector 216 along the direction of the optical axis of the light emitting device 120.

The power supply module 100 is configured such that the light emitting device 120 and the current control circuit are arranged to overlap each other in the direction of the optical axis of the light emitting device 120. Therefore, the current control circuit can be incorporated in the power supply module 100 in a space-saving manner without increasing a size of the housing 200 in directions perpendicular to the optical axis of the light emitting device 120.

Further, a portion of the positive electrode connecting part 111 and a portion the ground connecting part 112 are folded so as to be substantially parallel to the optical axis. Therefore, an area occupied by the positive electrode connecting part 111 and the ground connecting part 112 can be reduced in directions perpendicular to the optical axis of the light emitting device 120. According to another exemplary embodiment, the power supply module 100 may be configured such that a portion of one of the positive electrode connecting part 111 and the ground connecting part 112 is folded so as to be substantially parallel to the optical axis. In this case, likewise, an area occupied by the positive electrode connecting part 111 or the ground connecting part 112 can be reduced in directions perpendicular to the optical axis of the light emitting device 120.

The extension walls 115*a*, 115*b*, 115*c*, 115*d* are provided as a portion of the single structure including the positive electrode connecting part 111 and the ground connecting part 112, and are configured and arranged to function as heat dissipating fins (heat sinks). Therefore, separate heat dissipating fins need not be provided in addition to the power supply module 100.

Further, the extension walls 115*a*, 115*b*, 115*c*, 115*d* are folded toward the optical axis of the light emitting device 120. Therefore, it is possible to provide the extension walls 115*a*, 115*b*, 115*c*, 115*d* without increasing the size of the housing 200 in directions perpendicular to the optical axis of the light emitting device 120.

Figure 5:
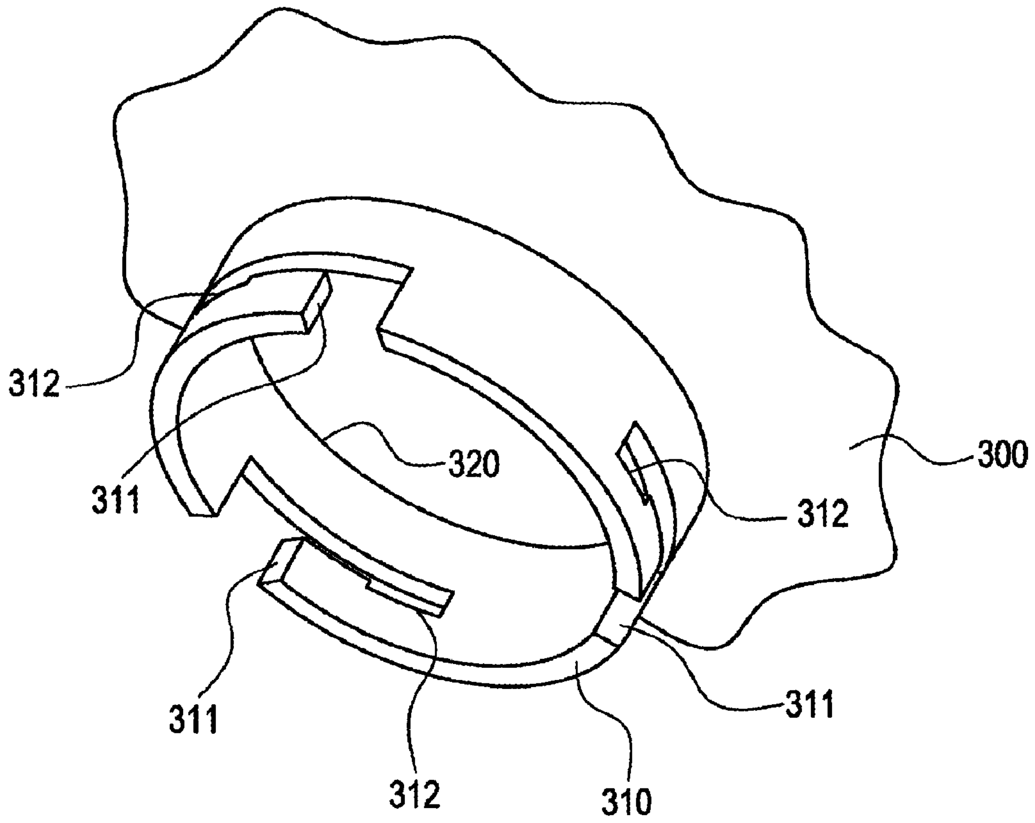
FIG. 5 is an enlarged view of a light source attaching portion of a lamp body.

FIG. 5 is an enlarged view of a light source attaching portion 310 of the lamp body 300 to which the vehicle lamp is attached. The lamp body 300 is, for example a portion of a headlamp.

The light source attaching portion 310 is a cylindrical portion extending from an opening 320 in the lamp body 300. An inner diameter of the light source attaching portion 310 is substantially equal to an outer diameter of the lower housing part 210. Engaging grooves 311 are formed in the light source attaching portion 310 at regular intervals along the circumferential direction. In this exemplary embodiment, three engaging grooves 311 are arranged at intervals of 120°.

When attaching the vehicle lamp to the lamp body 300, first, the locking protrusions 215 of the vehicle lamp are inserted into the respective engaging grooves 311 of the light source attaching portion 310. Then, the vehicle lamp is rotated so that the locking protrusions 215 are guided by the engaging grooves 311 and are fitted to locking recesses 312 that are formed at the ends of the respective engaging grooves 311, whereby the vehicle lamp is fixed to the lamp body 300.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

What is claimed is:

1. A vehicle lamp comprising:

a semiconductor light emitting device configured to serve as a light source of the vehicle lamp;

a power supply module configured to supply electric power from a power source to the semiconductor light emitting device; and a housing in which the power supply module is accommodated, wherein the semiconductor light emitting device is mounted on the power supply module, the power supply module comprises a current control circuit configured to control an amount of current supplied to the semiconductor light emitting device, and the semiconductor light emitting device and the current control circuit are arranged to overlap each other in a direction of an optical axis of the semiconductor light emitting device.

2. The vehicle lamp according to claim 1, wherein the semiconductor light emitting device comprises a positive terminal and a ground terminal, and the power supply module further comprises:

a positive electrode connecting part configured to electrically couple the positive terminal of the semiconductor light emitting device and a positive electrode of the power source; and a ground connecting part configured to electrically couple the ground terminal of the semiconductor light emitting device and a ground potential, wherein at least one of the positive electrode connecting part and the ground connecting part comprises a folded portion that is folded so as to extend in the direction of the optical axis.

3. The vehicle lamp according to claim 2, wherein the at least one of the positive electrode connecting part and the ground connecting part further comprises an extension wall extending from the folded portion in a direction substantially perpendicular to the direction of the optical axis.

4. The vehicle lamp according to claim 3, wherein the extension wall is folded toward the optical axis.

5. The vehicle lamp according to claim 1, wherein the housing comprises:

a first housing part to which the power supply module is attached; and a second housing part comprising an opening, wherein the second housing part is attached to the first housing part such that the optical axis of the semiconductor light emitting device extends through the opening.

6. The vehicle lamp according to claim 5, wherein the current control circuit comprises an electrode configured to be electrically coupled to the power source, and the first housing part comprises a connector into which the electrode of the current control circuit extends.

* * * * *